(12) United States Patent
Deville et al.

(10) Patent No.: US 9,556,075 B2
(45) Date of Patent: Jan. 31, 2017

(54) TUBULAR PORE MATERIAL

(75) Inventors: Sylvain Deville, Isle sur la Sorgue (FR); Celine Viazzi, Mons (FR)

(73) Assignees: SAINT-GOBAIN CENTRE DE RECHERCHIES ET D'ETUDES EUROPEEN, Courbevoie (FR); CENTRE NATIONALE DE RECHERCHE SCIENTIFIQUE, Paris (FR)

( * ) Notice: Subject to any disclaimer, the term of this patent is extended or adjusted under 35 U.S.C. 154(b) by 754 days.

(21) Appl. No.: 13/638,454

(22) PCT Filed: Apr. 1, 2011

(86) PCT No.: PCT/IB2011/051406
§ 371 (c)(1),
(2), (4) Date: Nov. 5, 2012

(87) PCT Pub. No.: WO2011/121572
PCT Pub. Date: Oct. 6, 2011

(65) Prior Publication Data
US 2013/0105386 A1    May 2, 2013

(30) Foreign Application Priority Data

Apr. 1, 2010  (FR) ..................... 10 52485

(51) Int. Cl.
*C04B 38/00* (2006.01)
*H01M 4/36* (2006.01)
(Continued)

(52) U.S. Cl.
CPC ....... *C04B 38/0054* (2013.01); *B01D 39/2068* (2013.01); *B01J 21/066* (2013.01);
(Continued)

(58) Field of Classification Search
CPC .. C04B 38/0022; C04B 38/0054; C04B 35/00; C04B 38/0074; C04B 38/0605; C04B 38/061; C04B 2111/00853; C04B 2235/3201; C04B 2235/3208; C04B 2235/3225; C04B 2235/3227; C04B 2235/3244; C04B 2235/3246; C04B 2235/3262
(Continued)

(56) References Cited

U.S. PATENT DOCUMENTS

| 4,025,350 A | 5/1977 | Walters et al. |
| 2005/0142431 A1 | 6/2005 | Shimomura et al. |

(Continued)

FOREIGN PATENT DOCUMENTS

| EP | 2548856 A1 | 1/2013 |
| JP | A-2001-192280 | 7/2001 |

(Continued)

OTHER PUBLICATIONS

International Search Report issued in International Patent Application No. PCT/IB2011/051404 dated Jul. 19, 2011.

(Continued)

*Primary Examiner* — Dirk Bass
(74) *Attorney, Agent, or Firm* — Oliff PLC

(57) ABSTRACT

Product formed from a ceramic material, at least part of the said product not being formed from amorphous silica and including pores and satisfying the following criteria (a), (b) and (c): (a) at least 70% by number of the said pores are frustoconical tubular pores extending substantially parallel to each other in a longitudinal direction; (b) in at least one cross-section plane, the mean size of the cross sections of the said pores is greater than 0.15 μm and less than 300 μm; (c) in at least one cross-section plane, at least 50% by number of the pores have a convexity index Ic of greater than 87%, (Continued)

the convexity index of a pore being equal to the ratio Sp/Sc of the surfaces Sp and Sc delimited by the perimeter and by the convex envelope of the said pore, respectively.

19 Claims, 9 Drawing Sheets

(51) Int. Cl.

| | |
|---|---|
| H01M 8/10 | (2016.01) |
| B01D 39/20 | (2006.01) |
| B01J 21/06 | (2006.01) |
| B01J 35/04 | (2006.01) |
| B01J 35/10 | (2006.01) |
| C04B 35/111 | (2006.01) |
| C04B 35/462 | (2006.01) |
| C04B 35/47 | (2006.01) |
| C04B 35/486 | (2006.01) |
| C04B 35/565 | (2006.01) |
| C04B 35/626 | (2006.01) |
| C04B 35/634 | (2006.01) |
| C04B 35/638 | (2006.01) |
| H01M 4/86 | (2006.01) |
| H01M 4/90 | (2006.01) |
| H01M 8/12 | (2016.01) |
| H01M 10/0562 | (2010.01) |
| C04B 111/00 | (2006.01) |

(52) U.S. Cl.
CPC .......... *B01J 35/04* (2013.01); *B01J 35/1076* (2013.01); *C04B 35/111* (2013.01); *C04B 35/462* (2013.01); *C04B 35/47* (2013.01); *C04B 35/486* (2013.01); *C04B 35/565* (2013.01); *C04B 35/6263* (2013.01); *C04B 35/638* (2013.01); *C04B 35/63416* (2013.01); *C04B 35/63488* (2013.01); *C04B 38/0022* (2013.01); *H01M 4/36* (2013.01); *H01M 4/8621* (2013.01); *H01M 4/90* (2013.01); *H01M 4/9033* (2013.01); *H01M 8/1016* (2013.01); *H01M 8/1246* (2013.01); *H01M 10/0562* (2013.01); *C04B 2111/00853* (2013.01); *C04B 2235/3201* (2013.01); *C04B 2235/3208* (2013.01); *C04B 2235/3225* (2013.01); *C04B 2235/3227* (2013.01); *C04B 2235/3244* (2013.01); *C04B 2235/3246* (2013.01); *C04B 2235/3262* (2013.01); *C04B 2235/3281* (2013.01); *C04B 2235/3286* (2013.01); *C04B 2235/3427* (2013.01); *C04B 2235/449* (2013.01); *C04B 2235/5436* (2013.01); *C04B 2235/606* (2013.01); *C04B 2235/6027* (2013.01); *C04B 2235/6562* (2013.01); *C04B 2235/6565* (2013.01); *C04B 2235/787* (2013.01); *C04B 2235/96* (2013.01); *Y02E 60/521* (2013.01); *Y02E 60/525* (2013.01); *Y02P 70/56* (2015.11); *Y10T 428/24273* (2015.01); *Y10T 428/249921* (2015.04)

(58) Field of Classification Search
USPC ......... 210/510.1; 264/28; 361/502; 422/503; 428/131, 221; 429/218.1, 304, 479, 523; 502/439
See application file for complete search history.

(56) References Cited

U.S. PATENT DOCUMENTS

| | | |
|---|---|---|
| 2005/0148132 A1 | 7/2005 | Wodnicki |
| 2007/0065701 A1 | 3/2007 | Cable et al. |
| 2007/0134748 A1 | 6/2007 | Kudo et al. |
| 2008/0025875 A1 | 1/2008 | Martin et al. |

FOREIGN PATENT DOCUMENTS

| | | |
|---|---|---|
| JP | 2007-163163 A | 6/2007 |
| JP | 2007-296750 A | 11/2007 |
| JP | 2009-046341 A | 3/2009 |

OTHER PUBLICATIONS

Written Opinion issued in International Patent Application No. PCT/IB2011/051404 dated Jul. 19, 2011.
U.S. Appl. No. 13/638,133, filed Sep. 28, 2012.
Jan. 12, 2015 Office Action issued in U.S. Appl. No. 13/638,133.
Dec. 25, 2014 Office Action issued in Japanese Application No. 2013-502027.
Jun. 24, 2014 Office Action issued in U.S. Appl. No. 13/638,133.
Nishihara et al., "Preparation of monolithic $SiO_2$—$Al_2O_3$ cryogels with inter-connected macropores through ice templating," *Journal of Materials Chemistry*, 2006, pp. 3231-3236, vol. 16, The Royal Society of Chemistry.
Moon et al., "Preparation of Dense Thin-Flm Solid Electrolyte on Novel Porous Structure with Parallel Pore Channel," *Journal of the Ceramic Society of Japan*, (2002), vol. 110, No. 5, pp. 479-484.
Nishihara et al., "Ordered Macroporous Silica by Ice Templating," *Chem. Mater.*, (2005), vol. 17, pp. 683-689.
Waschkies et al., "Control of Lamellae Spacing During Freeze Casting of Ceramics Using Double-Side Cooling as a Novel Processing Route," *J. Am. Ceram. Soc.*, (2009), vol. 92, No. S1, pp. S79-S84.
Nishihara et al., "Synthesis of silica-based porous monoliths with straight nanochannels using an ice-rod nanoarray as a template," *Journal of Materials Chemistry*, (2008), vol. 18, pp. 3662-3670.
Crumm et al., "Fabrication of Microconfigured Multicomponent Ceramics," *J. Am. Ceram. Soc.*, (1998), vol. 81, No. 4, pp. 1053-1057.
Koh et al., "Fabrication of Macrochannelled-Hydroxyapatite Bioceramic by a Coextrusion Process," *J. Am. Ceram. Soc.*, (2002), vol. 85, No. 10, pp. 2578-2580.
Van Hoy et al., "Microfabrication of Ceramics by Co-extrusion," *J. Am. Ceram. Soc.*, (1998), vol. 81, No. 1, pp. 152-158.
Wing et al., "Fabrication and Properties of an Anisotropic $TiO_2$ Dielectric Composite," *J. Am. Ceram. Soc.*, (2006) vol. 89, No. 9, pp. 2812-2815.
Bettge et al., "Engineered Porous Ceramics Using a Directional Freeze-Drying Process," *28th Int. Spring Seminar on Electronics Technology*, (May 2005), pp. 12-18.
Sofie, "Fabrication of Functionally Graded and Aligned Porosity in Thin Ceramic Substrates With the Novel Freeze-Tape-Casting Process," *J. Am. Ceram. Soc.*, (2007), vol. 90, No. 7, pp. 2024-2031.
Maire et al., "Characterization of the morphology of cellular ceramics by 3D image processing of X-ray tomography," *Journal of the European Ceramic Society*, (2007), vol. 27, pp. 1973-1981.
Oct. 26, 2010 French Search Report issued in French Patent Application No. FR 1052485 (with translation).
Jul. 19, 2011 Written Opinion of the International Searching Authority issued in International Application No. PCT/IB2011/051406.
Jul. 19, 2011 International Search Report issued in International Application No. PCT/IB2011/051406.
Oct. 22, 2015 Office Action issued in U.S. Appl. No. 13/638,133.
G. Petzold et al., "Ice Morphology: Fundamentals and Technological Applications in Foods," Food Biophysics, vol. 4, No. 4, Oct. 22, 2009, pp. 378-396.
May 7, 2016 Office Action issued in European Patent Application No. 11 718 162.8.

TUBULAR PORE MATERIAL

TECHNICAL FIELD

The invention relates to a ceramic product with tubular pores and to a method for manufacturing such a product, in particular to a method comprising a step of "ice templating".

This product is especially intended for the manufacture of ceramic electrochemical cells for fuel cells, especially of the SOFC type.

PRIOR ART

Ceramic electrochemical cells conventionally comprise a solid electrolyte, an anode and a cathode. They are especially used in electrochemical devices that function at temperatures generally below 1000° C., for example in fuel cells comprising an ionic conductive ceramic oxygen electrolyte, known as solid oxide fuel cells, in particular "SOFC" and "IT-SOFC" (Intermediate Temperature Solid Oxide Fuel Cell), or in fuel cells comprising a protonic conductive ceramic electrolyte, known as PCFC (Protonic Ceramic Fuel Cell). They are also used as oxygen or hydrogen pumps or in steam electrolysers for the production of hydrogen, in electrocatalysis reactors for the production of syngas, and more broadly for the electrochemical promotion of a certain number of reactions in the field of catalysis.

The article "*Preparation of dense thin film solid electrolyte on novel porous structure with parallel pore channels*" (2002) describes, for example, a method for manufacturing a structure comprising a dense layer (CGO) deposited on a porous layer (LSCF-CGO) manufactured by "ice templating". This structure is especially intended for SOFC cells, but also for membranes.

US 2007/0 065 701 describes an SOFC cell comprising two porous electrodes and an electrolyte, preferably made of the same material as the electrodes. An electrode is manufactured by impregnating a porous skeleton with a suspension of anode or cathode material. The porous skeleton is manufactured via a method comprising a step of freezing of a thin layer, known as "freeze tape casting". Each pore is tubular and has an equivalent diameter increasing from one extremity to the other of the pore: the equivalent diameter at the first and second extremities is between 0.5 and 15 μm and between 25 and 125 μm, respectively.

In the applications mentioned above, it is sought to increase the area of exchange between a porous product and a material, known as the "impregnation material", infiltrated into the porous product.

One object of the present invention is to provide a porous product that is suitable for the abovementioned applications and that may maximize the ratio between this area for exchange and the amount of impregnation material used.

Moreover, there is an ongoing need for porous products that have good mechanical properties, and in particular good compression strength.

One object of the present invention is to provide a porous product that also satisfies this need, or that is capable of leading, via sintering, to a product that satisfies this need.

Microporous substances with tubular pores are also used as catalyst support. The reason for this is that they allow a large surface of catalyst to be exposed.

The article "*Ordered macroporous silica by ice templating*", Nishihara et al., Chem. Mater., 2005, 17 (3), pp 683-689 describes, for example, on page 678, FIG. 4b, a smooth hexagonal amorphous silica structure with a median size of about 5 μm.

There is an ongoing need to increase the exposed surface. Furthermore, in certain applications, catalyst supports are subjected to severe mechanical stresses that may lead to their degradation, for example by rupture, or even to a reduction in their catalytic performance (decrease in yield and/or selectivity).

One object of the present invention is to provide a porous product that exposes a large surface and that is capable of withstanding severe mechanical stresses, in order especially for it to be able to serve as a catalyst support.

SUMMARY OF THE INVENTION

According to a first main embodiment, the invention relates to a product, which is preferably sintered, formed from a ceramic material, at least part, and preferably all, of the said product comprising pores and satisfying the following criteria (a), (b) and at least one from among the following criteria (c) and (d):

(a) at least 70%, preferably at least 80%, preferably at least 90%, or even substantially 100% by number of the said pores are frustoconical tubular pores (i.e. presenting the shape of a truncated cone) extending substantially parallel to each other in a longitudinal direction;

(b) in at least one cross-section plane, in particular a median cross-section plane, preferably in any cross-section plane, the mean size of the cross sections of the pores (taking into consideration all of the pores that are visible in the cross-section plane), referred to hereinbelow as the "mean pore size", is greater than 0.15 μm and less than 300 microns, preferably less than 270 μm;

(c) in at least one cross-section plane, in particular a median cross-section plane, preferably in any cross-section plane, at least 50% by number of the pores (taking into consideration all of the pores that are visible in the cross-section plane) have a convexity index Ic of greater than 87%, the convexity index of a pore being equal to the ratio Sp/Sc of the surface areas Sp and Sc delimited by the perimeter and by the convex envelope of the said pore, respectively;

(d) in at least one cross-section plane, in particular a median cross-section plane, preferably in any cross-section plane, at least 50% by number of the pores (taking into consideration all the pores that are visible in the cross-section plane) have a solidity index Is of greater than 87%, the solidity index of a pore being measured according to the method described below.

As will be seen in greater detail in the rest of the description, the inventors have discovered that a particular form of pores makes it possible to improve the amount of impregnation material that it is possible to infiltrate into the porous product. More particularly, they have discovered that the combination of a slightly frustoconical tubular form, of reduced cross section, and of a sparingly concave perimeter (viewed from the exterior) makes it possible to increase the amount of impregnation material that it is possible to infiltrate. In an application for a fuel cell, this result makes it possible to increase the performance of the cell.

Without being bound by this theory, the inventors explain this result by the fact that the specific form of the pores facilitates the passage of the particles of the impregnation material. These particles can thus penetrate very deeply into the pores.

A porous product according to the first main embodiment of the invention may also comprise one or more of the following optional characteristics:

The mean pore size is greater than 0.5 μm, preferably greater than 1 μm, or even greater than 2 μm, or even greater than 5 μm and/or less than 200 μm, or even less than 150 μm, or even less than 100 μm, or even less than 50 μm, or even less than 15 μm, or even less than 10 μm.

The mean pore size is between 1 and 10 μm. This characteristic is particularly advantageous in an application for a microreactor and/or for filtration.

The mean pore size is between 2 and 5 μm. This characteristic is particularly advantageous in an application for an electrode of an SOFC cell.

The mean pore size is between 10 and 30 μm. This characteristic is particularly advantageous in an application for an electrolyte of an SOFC cell.

The mean pore size is between 100 and 270 μm. This characteristic is particularly advantageous in an application for a heat exchanger.

The mean pore size is between 1 and 100 μm. This characteristic is particularly advantageous in an application for a single-chamber fuel cell.

The shape of the pores is such that:
- at least 60% and preferably at least 70% by number of the pores have a convexity index Ic and/or a solidity index Is of greater than 87%, and/or
- at least 40%, preferably at least 44% and preferably at least 54% by number of the pores have a convexity index Ic and/or a solidity index Is of greater than 88%, and/or
- at least 30%, preferably at least 36%, preferably at least 40%, preferably at least 44% and preferably at least 50% by number of the pores have a convexity index Ic and/or a solidity index Is of greater than 89%, and/or
- at least 24%, preferably at least 30%, preferably at least 36%, preferably at least 40%, preferably at least 44% and preferably at least 50% by number of the pores have a convexity index Ic and/or a solidity index Is of greater than 90%, and/or
- at least 20%, preferably at least 24%, preferably at least 30%, preferably at least 35%, preferably at least 40%, preferably at least 45% by number of the pores have a convexity index Ic and/or a solidity index Is of greater than 91%, and/or
- at least 16%, preferably at least 20%, preferably at least 24%, preferably at least 30%, preferably at least 40% by number of the pores have a convexity index Ic and/or a solidity index Is of greater than 92%, and/or
- at least 4%, preferably at least 8%, preferably at least 10% and preferably at least 20% by number of the pores have a convexity index Ic and/or a solidity index Is of greater than 93%.

According to a second main embodiment, the invention relates to a product, which is preferably sintered, formed from a ceramic material, at least part and preferably all of the said product not being formed from amorphous silica, comprising pores and satisfying the following criteria:
(a') at least 70%, preferably at least 80%, preferably at least 90%, or even substantially 100% by number of the said pores are tubular, preferably frustoconical pores, extending substantially parallel to each other in a longitudinal direction;
(b') in at least one cross-section plane, in particular a median cross-section plane, preferably in any cross-section plane,
at least 30% by number of the pores have a section of convex hexagonal shape (viewed from the exterior), these pores being referred to hereinbelow as "hexagonal pores", at least 80% by number of the said hexagonal pores having a roundness index of greater than 0.7, the roundness index being equal to the ratio SA/LA of the lengths of the small and large axes of the ellipse in which the said section is inscribed;
the average size of the cross sections of the said pores ("mean pore size", taking into consideration all the pores that are visible in the cross-section plane) is greater than 0.15 μm and less than 25 μm.

As will be seen in greater detail in the rest of the description, the inventors have discovered that the convex hexagonal shape and the size of the pores of a product according to the second main embodiment of the invention makes it possible to obtain a large exposed surface area and noteworthy mechanical strength. The particular shape of the tubular pores also allows particularly efficient infiltration by a catalyst.

A porous product according to the second main embodiment of the invention may also comprise one or more of the following optional characteristics:

Preferably, in the said cross-section plane, each hexagonal pore being circumscribed in a convex hexagon HG (of which, by definition, all the sides are straight segments), regular or irregular, with a minimum area $A_{HG}$, the ratio R denoting the ratio between the length of the longest side and the length of the smallest side of the convex hexagon HG,
- at least 50%, preferably at least 60%, preferably at least 70% or even at least 80% by number of the hexagonal pores have a ratio R of greater than 0.7, and/or
- at least 35%, preferably at least 40%, or even at least 50%, or even at least 60% by number of the hexagonal pores have a ratio R of greater than 0.75, and/or
- at least 20%, or even at least 30% by number of the hexagonal pores have a ratio R of greater than 0.8.

Preferably, in the said cross-section plane, at least 80% and preferably at least 90% by number of the pores have a section of convex hexagonal shape and have a roundness index of greater than 0.75 and preferably greater than 0.80.

Preferably, in the said cross-section plane, at least 35%, preferably at least 40%, preferably at least 50%, preferably at least 60%, preferably at least 70%, preferably at least 80%, or even at least 90%, or even 95%, or even substantially 100% by number of the pores have a section of convex hexagonal shape.

In the said cross-section plane, the mean pore size is greater than 0.25 μm, preferably greater than 0.5 μm, preferably greater than 1 μm, preferably greater than 2 μm, and/or less than 20 μm, preferably less than 18 μm, preferably less than 15 μm and preferably less than 10 μm.

In one embodiment, the walls (i.e. the material between the pores) of the product according to the invention are porous (i.e. the porosity of the walls is typically greater than or equal to 10% by volume). In another embodiment, the walls of the product according to the invention are dense (i.e. the porosity of the walls is typically less than 10% by volume).

Preferably, the pores other than the hexagonal pores are pores formed by interpenetration of pores which would otherwise be hexagonal pores.

Irrespective of the main embodiment, a porous product according to the invention may also comprise one or more of the following optional characteristics:

The geometry of the cross section of the pores is substantially constant, irrespective of the cross section considered. For example, a pore has a cross section of convex hexagonal general shape, irrespective of the cross-section plane considered, which does not preclude the possibility of the area of this section being variable, in particular when the pore is of frustoconical shape.

The open porosity is greater than 30%, or even greater than 40% and/or less than 90%, preferably less than 80%, preferably less than 70%, or even less than 60%, or even less than 50%. Advantageously, the mechanical properties are thereby improved.

At least 70%, preferably at least 80% and preferably at least 90% by number of the pores are frustoconical tubular pores opening via their two extremities with large and narrow apertures, respectively. These pores are known as "through-pores". It is thus easier to impregnate them, especially with a catalyst. In the case of use as a catalyst support, the catalytic reactions are also thereby improved.

At least 70%, preferably at least 80%, preferably at least 90%, or even substantially 100% by number of the said pores are frustoconical tubular through-pores, the ratio R' of the mean equivalent diameter (on average over all of the said through-pores) of the narrow apertures to the mean equivalent diameter (on average over all of the said through-pores) of the large apertures being less than 0.99, preferably less than 0.95, or even less than 0.90, or even less than 0.85, or even less than 0.80, or even less than 0.75, in particular for the second main embodiment, less than 0.90, or even less than 0.85, or even less than 0.80, or even less than 0.75.

The ceramic material comprises, or even is formed from, at least one oxide, preferably chosen from group A formed by zirconium oxide or zirconia ($ZrO_2$), partially stabilized zirconium oxide, stabilized zirconium oxide, yttrium oxide ($Y_2O_3$), doped yttrium oxide, preferably yttrium oxide doped with samarium oxide, titanium oxide ($TiO_2$), aluminosilicates such as mullite, cordierite ($Al_3Mg_2AlSi_5O_{18}$), aluminium oxide or alumina ($Al_2O_3$), hydrated aluminas, and in particular boehmite, magnesium oxide (MgO), talc ($Mg_3Si_4O_{10}(OH)_2$), nickel oxide (NiO), iron oxides (FeO, $Fe_2O_3$, $Fe_3O_4$), cerium oxide, doped cerium oxide, oxides of perovskite structure, in particular gallates, compounds comprising lanthanum of the type $LaAlO_3$ or $LaGaO_3$ or $La_{(1-x)}Sr_xMO_3$, with $0 \le x \le 1$ and M an element chosen from the group formed from chromium, cobalt, magnesium, iron, gadolinium and manganese, and mixtures thereof; oxides of perovskite structure doped with platinum and/or palladium and/or rhodium and/or gold and/or silver, for example $La_{(1-x)}Sr_xM_{(1-y)}M'_yO_3$ with $0 \le x \le 1$, $0 \le y \le 0.15$, M being an element chosen from the group formed by chromium, cobalt, magnesium, iron, gadolinium and manganese, and mixtures thereof, M' being an element chosen from the group formed by platinum, palladium, rhodium, gold and silver, and mixtures thereof, compounds comprising titanium of the type $La_4Sr_8Ti_{11}Mn_{1-x}Ga_xO_{38}$ with $0 \le x \le 1$ and $La_4Sr_8Ti_{12-n}Mn_nO_{38}$ with $0 \le n \le 1$, compounds of the type $BaTiO_3$, $BaZrO_3$, $Pb(Mg_{0.25}Nb_{0.75})O_3$, $Ba(Zn_{0.25}Nb_{0.75})O_3$, $Pb(Zn_{0.25}Nb_{0.75})O_3$, $PbTiO_3$, $CaCu_3Ti_4O_{12}$, compounds of bimevox-type structure, for example $Bi_2V_{1-x}Me_xO_z$ with $0 \le x \le 1$, z ensuring the electrical neutrality, and Me an element chosen from the group formed by magnesium, aluminium, silicon, titanium, cobalt, nickel, copper, zinc, manganese, antimony, tantalum, niobium, chromium, molybdenum, tungsten and uranium, and mixtures thereof, compounds of lamox-type structure, for example $La_2Mo_2O_9$, compounds of apatite structure, for example $Me'_{10}(XO_4)_6Y'_2$ in which Me' is a metal cation chosen from the group formed by $Ca^{2+}$, $Cd^{2+}$, $Sr^{2+}$, $Ba^{2+}$, $Pb^{2+}$, $Na^+$ and $K^+$, rare-earth metal cations, preferably $La^{3+}$ and $Nd^{3+}$, $Al^{3+}$, $U^{4+}$, $Th^{4+}$, ($XO_4$) is an anionic group chosen from $PO_4^{3-}$, $SiO_4^{4-}$, $AsO_4^{3-}$, $MnO_4^-$, $SO_4^{2-}$, $CO_3^{2-}$, $HPO_4^{2-}$, $SiO_4^{4-}$ and $GeO_4^{4-}$, and mixtures thereof, and Y' is an anion chosen from $F^-$, $Cl^-$, $OH^-$, $Br^-$, $I^-$, $CO_3^{2-}$ and $O^{2-}$, and mixtures thereof, compounds of the type $SrCe_{1-x}M_xO_3$ with $0 \le x \le 1$ and M a rare-earth metal, M preferably being ytterbium, compounds of the type $BaCe_{1-x}M_xO_3$, with $0 \le x \le 1$ and M a rare-earth metal, for example the compound $BaCeO_3$, compounds of the family $La_xSr_{1-x}ScO_3$ with $0 \le x \le 1$, for example $La_{0.9}Sr_{0.1}ScO_3$, zeolites of structure $Na_{x1}Ca_{x2}Mg_{x3}Ba_{x4}K_{x5}A_{x6}(Si_{x7}O_{x8}),x9H_2O$, x1 to x9 being positive integers or zero satisfying the following conditions: x6>0, x7>0, x8>0, x9>0 and x1+x2+x3+x4+x5>0, and mixtures thereof. Preferably, the zirconium oxide is stabilized, partially and preferably totally, with yttrium oxide and/or with calcium oxide and/or with magnesium oxide and/or with cerium oxide and/or with scandium oxide and/or with samarium oxide and/or with strontium oxide and/or with titanium oxide, preferably with yttrium oxide. Preferably, the cerium oxide is doped with samarium oxide and/or with gadolinium oxide and/or with yttrium oxide and/or with iron oxide, preferably doped with gadolinium oxide.

In particular when the product is manufactured according to a method according to the invention using zirconium acetate, it comprises zirconia, at least in trace amounts. Preferably, the zirconia content is greater than 1.5%, greater than 2%, or even greater than 5% and/or less than 40%, preferably less than 20%, preferably less than 15% and preferably less than 10%. Preferably, the zirconia is uniformly distributed within the said product.

In one embodiment, the ceramic material is not formed from amorphous silica ($SiO_2$), or even silica, or even comprises not more than 99%, not more than 90%, not more than 80%, not more than 10%, or even does not comprise any amorphous silica, or even silica ($SiO_2$). Advantageously, the aging at temperatures above 1000° C. in the presence of steam is thereby improved.

The ceramic material may comprise, or even may be formed from at least one non-oxide, preferably chosen from group B formed by silicon carbide (SiC), silicon nitride, boron nitride, boron carbide, tungsten carbide, molybdenum disilicide ($MoSi_2$) and titanium boride ($TiB_2$), and mixtures thereof.

The product is manufactured via an "ice templating" method.

The smallest dimension of a porous product according to the invention is greater than 10 μm, preferably greater than 15 μm, or even greater than 50 μm, or even greater than 100 μm, or even greater than 200 μm, or even greater than 500 μm, or even greater than 1 mm, or even greater than 5 mm, or even greater than 10 mm.

The invention also relates to a manufacturing method comprising the following successive steps:

a) preparation of a slip comprising, as a volume percentage, more than 4% of a powder of ceramic particles suspended in an aqueous liquid phase, the said liquid phase comprising a crystal growth activator, b) optionally, pouring of the slip into a mould and/or removal of the air bubbles contained in the slip, c) oriented freezing of the slip so as to form a block comprising an assembly of ice crystals each having an elongated and preferably frustoconical tubular shape, d) optionally, stripping of the said block of frozen slip from the mould, e) removal of the ice crystals from the said frozen block of slip, optionally stripped from the mould, preferably by sublimation, so as to obtain a porous preform, f) optionally, removal of binder from the porous preform obtained at the end of step e), g) optionally, sintering of the porous preform obtained at the end of step e) or f) so as to obtain a porous sintered product, h) optionally, machining and/or impregnation of the said porous sintered product.

In one embodiment, the crystal growth activator comprises, or even is formed from, zirconium acetate (ZrA). Preferably, zirconium acetate is added to the slip in an amount such that the concentration of zirconium provided by the zirconium acetate is between 14 g/l and 170 g/l of liquid phase of the slip.

Preferably also, and in particular when the crystal growth activator comprises, or even is formed from, zirconium acetate, the pH of the slip is adjusted to between 2.75 and 5. Growth of the ice crystals is then advantageously substantially unidirectional.

Preferably also, and in particular when the crystal growth activator comprises, or even is formed from, zirconium acetate, the speed of the solidification front is less than 400 μm/s and preferably less than 300 μm/s.

When the crystal growth activator comprises, or even is formed from, zirconium acetate, the speed of the solidification front must be greater than 40 μm/s to manufacture a product according to the second main embodiment.

Preferably, the method does not comprise an intermediate step between steps a) and b), and/or b) and c), and/or c) and d), and/or d) and e), and/or e) and f), and/or f) and g), and/or g) and h). Preferably, it does not comprise a step before step a) and/or after step h).

Preferably, in step a):
zirconium acetate is added to the slip in an amount such that the concentration of zirconium provided by the zirconium acetate is between 14 g/l and 170 g/l of liquid phase of the slip; and the powder of ceramic particles is introduced after introduction of the zirconium acetate or of zirconium acetate precursors; and the pH of the slip is adjusted to between 2.75 and 5; and the amount of powder of ceramic particles in the slip is less than 50% by volume.

Without being bound by any theory, the inventors think that the zirconium acetate in solution may lead to the formation of complexes, in particular the complex $Zr(OH)_3(CH_3COO)_2$, which are thought to have a particular configuration allowing them to activate the growth of the ice crystals on certain crystallographic faces.

As a function of the method parameters, it is possible to obtain cylindrical tubular pores, i.e. of constant cross section (the cross section not being necessarily circular) or frustoconical tubular pores.

The conditions for establishing a speed of the solidification front that makes it possible to manufacture frustoconical pores are described hereinbelow, especially in the examples.

The conditions for establishing a speed of the solidification front that makes it possible to manufacture cylindrical pores are described in "*Control of lamellae spacing during freeze casting of ceramics using double-side cooling as a novel processing route*", Waschkies et al. J. Am. Ceram. Soc., 92 [S1] S79-S84 (2009), and more particularly in the description of FIG. 2.

The invention also relates to a preform that is obtained or that may have been obtained after a method comprising steps a) to e) above.

The invention also relates to a product that is obtained or that may have been obtained via a method according to the invention.

The invention also relates to a device chosen from a ceramic electrochemical cell, a fuel cell, and in particular an SOFC cell, an IT-SOFC cell, a PCFC cell, a single-chamber fuel cell, a filter element for a liquid or gaseous fluid, a storage microstructure used for storing, in the pores, a substance, a catalyst support, a heat exchanger, a heat insulator, a fluid distributor for conveying the said fluid, and especially a gas distributor, a drop separator or a trickle block for an air processing plant, a battery, and especially a battery electrolyte, a supercapacitor, a moisture adsorber, a combustion microchamber, the said device comprising a product according to the invention or manufactured according to a method according to the invention. This product may be used in particular as electrolyte impregnated into the abovementioned cells.

The invention relates in particular to a device comprising a support comprising a product according to any one of the preceding claims, impregnated with an impregnation material chosen from:

the materials of groups A and/or B above, a catalytic coating comprising or formed from a catalyst material chosen from metals, preferably iron (Fe), cobalt (Co), nickel (Ni), molybdenum (Mo), copper (Cu), ruthenium (Ru), rhodium (Rh), platinum (Pt), palladium (Pd), gold (Au), silver (Ag), iridium (Ir), osmium (Os), rhenium (Re), and mixtures thereof;

oxides, preferably the oxides of scandium (Sc), titanium (Ti), vanadium (V), chromium (Cr), cobalt (Co), copper (Cu), palladium (Pd), molybdenum (Mo), iron (Fe), nickel (Ni), tungsten (W), rhenium (Re), oxides of perovskite structure, oxides of fluorite structure, zeolites, oxides of lanthanides, preferably $CeO_2$, and mixtures thereof;

carbides, oxycarbides of formula $(carbide)_{1-x}O_x$, with $0<x<1$;

and mixtures thereof;

and mixtures thereof.

For the purposes of the present invention, the term "catalytic coating" means a coating comprising or formed from a catalyst material known for catalysing a chemical reaction. This catalytic coating may also, in a well-known manner, comprise a support material, generally of high specific surface area, mixed with the catalyst material so as to ensure its dispersion. This support material may be an oxide.

In particular, in the first main embodiment, the impregnation material may be chosen from groups A and/or B above. In particular, in the second main embodiment, the impregnation material may be chosen from:

the materials of group A, the materials of group B, a catalytic coating comprising or formed from a catalyst material chosen from
- metals, preferably iron (Fe), cobalt (Co), nickel (Ni), molybdenum (Mo), copper (Cu), ruthenium (Ru), rhodium (Rh), platinum (Pt), palladium (Pd), gold (Au), silver (Ag), iridium (Ir), osmium (Os), rhenium (Re), and mixtures thereof;
- oxides, preferably the oxides of scandium (Sc), titanium (Ti), vanadium (V), chromium (Cr), cobalt (Co), copper (Cu), palladium (Pd), molybdenum (Mo), iron (Fe), nickel (Ni), tungsten (W), rhenium (Re), oxides of perovskite structure, oxides of fluorite structure, zeolites, lanthanide oxides, preferably $CeO_2$, and mixtures thereof;
- carbides, oxycarbides of formula $(carbide)_{1-x}O_x$, with $0<x<1$;
- and mixtures thereof.

The impregnation may lead to simple coating at the surface of the pores or to partial or total filling of the said pores.

Preferably, the impregnation material is different from the material of the product according to the invention into which it is infiltrated.

In one embodiment, the impregnation material is introduced in the form of precursors, for instance nitrates, acetates, sulphates, chlorides, or organic molecular compounds, for instance a zirconium alkoxide.

In one embodiment, the impregnation material comprises particles with a median size less than 0.1 times the mean equivalent diameter of the large apertures of the frustoconical tubular pores, preferably less than 0.1 times the mean equivalent diameter of the narrow apertures of the said pores. The median size of the particles of the impregnation material may typically be between 0.01 μm and 4 μm.

The invention also relates to the use of a device according to the invention, the said product comprising pores, at least 70% by number of the said pores being tubular pores extending substantially parallel to each other in a longitudinal direction, the cross sections of the said pores having, in at least one cross-section plane, in particular a median cross-section plane, preferably in any cross-section plane, an average size
- of between 1 and 10 μm, the said product being used in an application for a microreactor and/or for filtration, or
- between 2 and 5 μm, the said product being used in an application for an electrode of a solid oxide fuel cell of the SOFC type,
- between 10 and 30 μm, the said product being used in an application for an electrolyte of a solid oxide fuel cell of the SOFC type, or
- between 100 and 270 μm, the said product being used in an application for a heat exchanger, or
- between 1 and 100 μm, the said product being used in an application for a single-chamber fuel cell.

DEFINITIONS

The term "ceramic material" means any nonmetallic and non-organic material.

The term "sublimation" means an operation that consists, generally under vacuum, in evaporating the ice without melting it.

The term "melting" means an operation that consists in melting the ice.

The term "zirconium acetate" means the compound of chemical formula $Zr(CH_3COO)_4$, of CAS number 7585-20-8.

The term "equivalent diameter" of the aperture or of a section of a pore means the diameter of a disc of the same surface area as the said aperture or as the said section.

The mean pore diameter, measured in a cross-section plane, is equal to the arithmetic mean of the equivalent diameters of the pores measured in this cross-section plane.

The term "tubular pore" means a pore that has the general shape of a tube opening via one of its two ends ("blind pore") or via its two ends ("through-pore"). In a product according to the invention, the majority of the pores are tubular pores that extend substantially parallel to each other, the axes of these pores being oriented in a common direction known as the "longitudinal direction" and determined by the direction of advance of the solidification front. The longitudinal direction is substantially rectilinear. The term "cross-section plane" means a section plane perpendicularly cutting the longitudinal direction. A median cross-section plane is a cross-section plane cutting the longitudinal direction at the mid-length of the pores, the mid-length being defined as an average on all the pores. The term "cross section" of a pore means the section of this pore in a cross-section plane. The length of a tubular pore is the dimension measured along its axis, between its two extremities.

A section "of convex hexagonal shape" is a 6-sided convex polygonal shape, each side having the general shape of a straight segment. It is considered that "each side has the general shape of a straight segment" when the section may be arranged between first and second convex hexagons of which all the sides are straight segments, the first hexagon HG being the hexagon of minimum area $A_{HG}$ circumscribing the said section, and the second hexagon HP being the hexagon of maximum area $A_{HP}$ inscribed in the said section, the ratio $A_{HG}/A_{HP}$ being less than 1.2. Needless to say, the two hexagons are therefore not necessarily homothetic. FIG. 13 shows the perimeter 10 of a pore in a cross section and the two hexagons HG and HP.

The roundness index of a pore, measured in a cross section, is equal to the ratio SA/LA of the lengths of the small and long axes of the ellipse E in which the said section is inscribed, as also shown in FIG. 13.

A crystal growth activator is an additive whose presence in the slip promotes, during freezing, the growth of ice crystals on certain faces to the detriment of others, the said faces being such that, after freezing, the axis c (as defined in FIG. 8) of the crystallographic structure of the said ice crystals is substantially perpendicular to the direction of solidification. In one particular embodiment, a crystal growth activator is an additive whose presence in the slip leads, during freezing, to activation of crystal growth in the basal plane of the ice crystals (defined by the axes a and b in FIG. 8) or in the normal to this plane (defined by the axis c).

The "size" of a particle is conventionally given by a granulometric distribution characterization. A laser granulometer makes it possible, for example, to measure sizes of less than or equal to 5 mm. The term "median size" of an assembly of particles, in particular within an impregnation material of a powder, means the percentile $D_{50}$, i.e. the size dividing the particles into first and second populations that are equal by mass, these first and second populations comprising only particles having a size greater than, or less than, respectively, the median size.

The term "temporary" means "removed from the product during sintering".

The term "oriented" freezing means freezing performed gradually along one or more given directions.

The term "totally stabilized zirconium oxide" means a zirconium oxide having an amount of zirconium oxide in a monoclinic crystallographic form of less than 1% by mass, the remainder being formed from zirconium oxide in a stable and/or metastable quadratic, and/or cubic crystallographic form.

An amorphous silica is a silica having less than 10% of its weight in a crystalline form.

A microreactor is a miniature reactor used for performing a chemical reaction.

Unless otherwise indicated, all the percentages, and in particular the percentages relating to the composition of a product according to the invention, are mass percentages. An exception concerns the percentages relating to the composition of a slip according to the invention, which, unless otherwise indicated, are volume percentages relative to the volume of the slip.

The various characteristics of a product according to the invention may be determined via the characterization methods used for the examples below.

BRIEF DESCRIPTION OF THE FIGURES

Other characteristics and advantages of the invention will also emerge on examining the drawing, given as a non-limiting illustration, in which.

Figure 1:
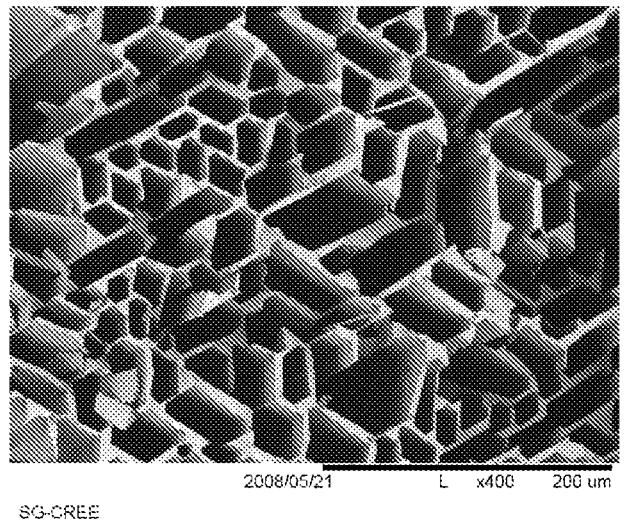
FIGS. 1 to 7 are images taken using a scanning electron microscope (SEM) of the porous products of Examples 1 to 7, respectively.
Figure 2:
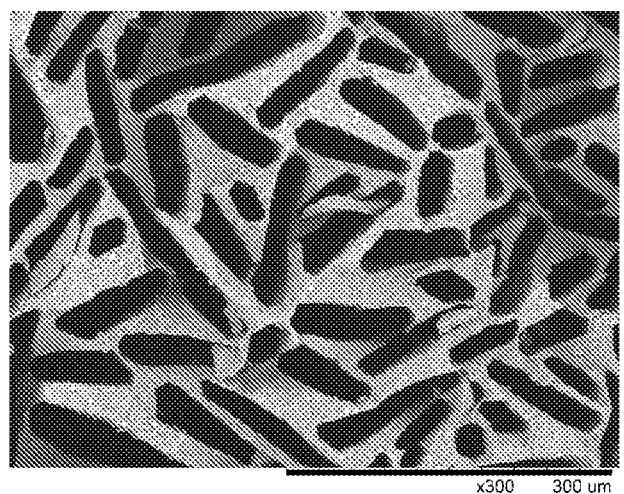
Figure 3:
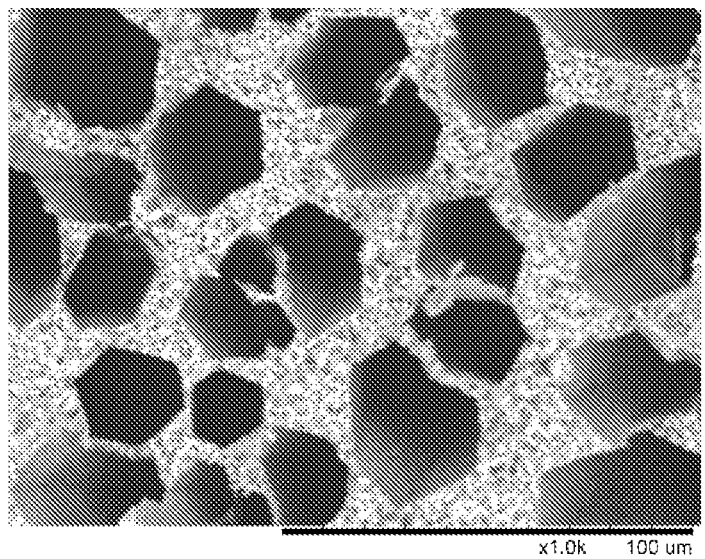
Figure 4:
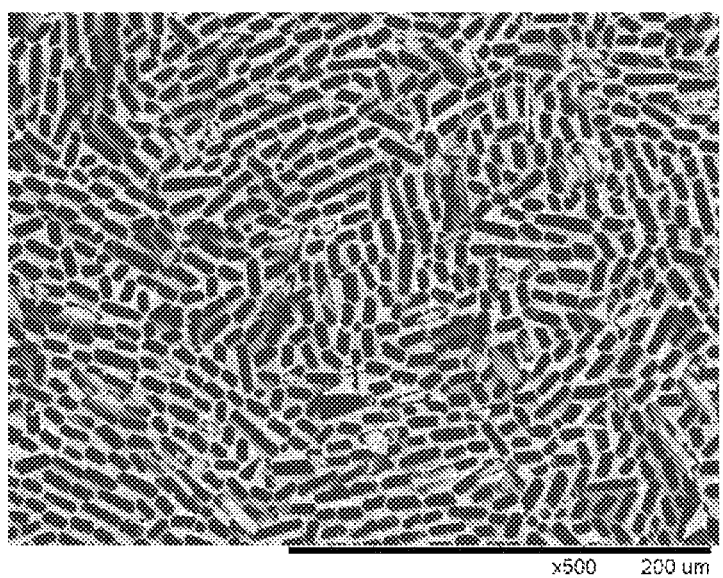
Figure 5:
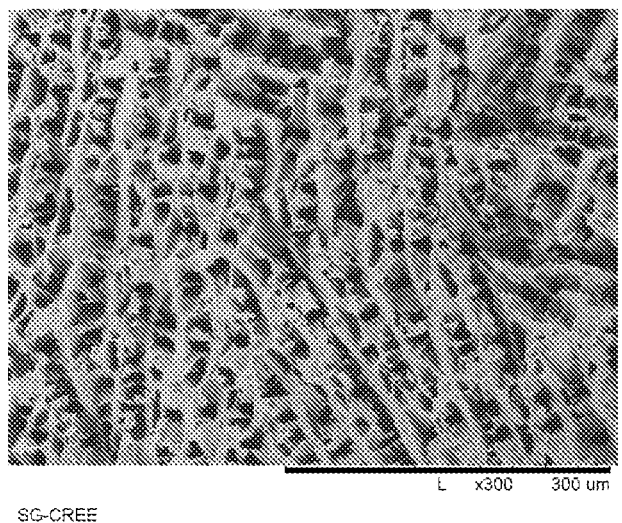
Figure 6:
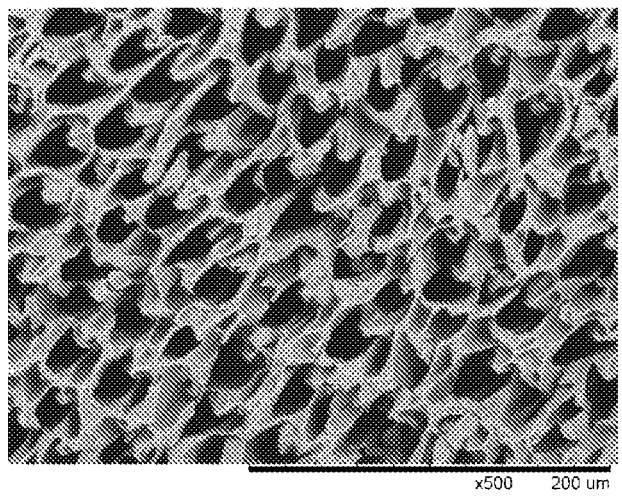
Figure 7:
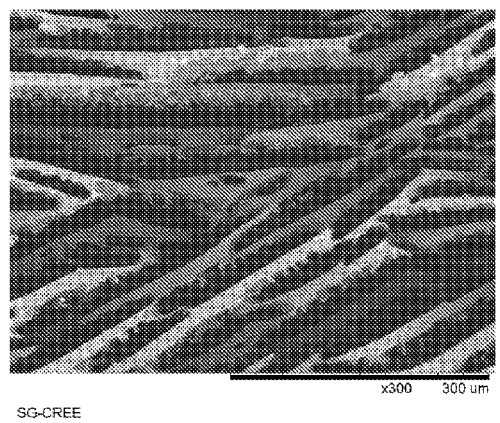

In the figures, identical references have been used to denote identical or similar objects.

DETAILED DESCRIPTION

A product according to the invention may be manufactured according to a method comprising steps a) to h) above.

In step a) of preparation of the slip, an aqueous suspension of a powder of ceramic particles is prepared.

The material of the ceramic particles may be chosen from groups A and/or B above. The amount of powder in suspension is preferably greater than 10% and/or less than 40%, preferably less than 30%, as a volume percentage of the slip. When the crystal growth activator is zirconium acetate, the amount of powder in suspension must be less than 50%, as a volume percentage on the basis of the slip.

The median size of the powder is preferably greater than 0.02 μm, preferably greater than 0.1 μm, preferably greater than 0.3 μm and/or less than 20 μm, preferably less than 10 μm, preferably less than 5 μm, preferably less than 1 μm.

The amount of liquid phase, or even the amount of water, is preferably greater than 50%, preferably greater than 60%, preferably greater than 70%, preferably greater than 80%, preferably greater than 90%, as a volume percentage of the slip.

The liquid phase preferably contains more than 50% water, preferably more than 60%, preferably more than 70%, preferably more than 80%, preferably more than 90% water, as a volume percentage on the basis of the liquid phase. The liquid phase may be formed from water.

According to the invention, a crystal growth activator is added.

The concentration of crystal growth activator in the slip is preferably less than 200 g/l of liquid phase of the slip, or even less than 150 g/l, or even less than 100 g/l, or even less than 75 g/l and/or greater than 0.1 g/l, or even greater than 1 g/l, or even greater than 10 g/l, or even greater than 20 g/l, or even greater than 30 g/l, or even greater than 50 g/l of liquid phase of the slip.

Preferably, the crystal growth activator is zirconium acetate. Advantageously, the implementation of the method is thereby simplified. Zirconium acetate is preferably added to the slip. Advantageously, the implementation of the method is thereby promoted. Zirconium acetate precursors, for example zirconium carbonate and/or acetic acid, may be added, alone or with zirconium acetate, their amount being adjusted so as to obtain the desired amount of zirconium acetate. When zirconium acetate precursors are used, the slip is preferably heated, preferably to a temperature of about 80° C. for 1 hour, and the pH is adjusted to a value of between 2.8 and 3.

Preferably, the amount of zirconium acetate in the slip corresponds to a concentration of zirconium provided by the zirconium acetate, measured as described below, of greater than 14 g/l, greater than 16 g/l, greater than 20 g/l, greater than 50 g/l, and less than 170 g/l, less than 150 g/l, less than 140 g/l, less than 130 g/l, less than 100 g/l of liquid phase of the slip. This results in a mass content of zirconia in the sintered product of greater than 1.5% and less than 40%. This zirconia, uniformly distributed in the said product, may constitute a signature of the use of a method according to the invention that has used zirconium acetate as crystal growth activator.

Preferably, when the amount of zirconium acetate in the slip corresponds to a concentration of zirconium provided by zirconium acetate, measured as described below, of less than 20 g/l, the pH is greater than 4.

In one embodiment, the crystal growth activator is not a protein. Advantageously, the implementation of the method is thereby facilitated.

The slip preferably contains at least one binder, which is preferably temporary. Preferably, the binder content is between 0.5% and 5% by mass on the basis of the amount of powder of ceramic particles. Advantageously, the mechanical strength before sintering is thereby improved. The temporary binders conventionally used for the manufacture of sintered products may be used, for example polyvinyl alcohol (PVA), polyethylene glycols (PEG), or celluloses.

The slip may also contain a dispersant that facilitates the production of a uniform suspension. Preferably, the dispersant content is between 0.1% and 10% by mass on the basis of the amount of powder of ceramic particles. The dispersants conventionally used for the manufacture of sintered products by casting a slip may be used, for example polyammonium methacrylates such as Darvan C manufactured by the company Vanderbilt.

The slip may also contain an antifoam. Preferably, the antifoam content is between 0.1% and 10% by mass on the basis of the amount of powder of ceramic particles. The antifoams conventionally used for the manufacture of sintered products by casting a slip may be used, for example Contraspum Conc. sold by the company Zschimmer-Schwarz.

The inventors have also discovered that the pH of the slip can modify the morphology of the ice crystals formed in the freezing step. In particular, when the crystal growth activator is zirconium acetate, the pH of the slip must be between 2.75 and 5, preferably between 3 and 4.5, preferably between 3.5 and 4.5, or even between 3.9 and 4.3. The addition of zirconium acetate may suffice to stabilize the pH of the slip within these ranges. If such is not the case, the pH may be adjusted by adding organic and/or inorganic acids or bases.

Adjusting the pH also advantageously makes it possible to deagglomerate and to disperse the particles of the ceramic powder. To this end, one or more steric and/or electrosteric dispersants may also be added to the slip.

In one embodiment, the ceramic powder, the water, the optional binder, the optional dispersant, the optional antifoam and the crystal growth activator together represent more than 80%, more than 90%, more than 95%, more than 99%, or even substantially 100% of the mass of the slip.

Preferably, the various constituents of the slip are added with stirring.

The order of introduction of the various constituents of the slip is preferably as follows:
the crystal growth activator, in particular zirconium acetate, is placed in suspension,
the optional binder and/or dispersant are then added, preferably after having been dissolved in water,
the ceramic powder is finally added.

If the amount of zirconium acetate in the slip corresponds to a zirconium concentration of less than 40 g/l of liquid phase of the slip, the ceramic powder must be introduced after the introduction of the zirconium acetate and/or the zirconium acetate precursors into the liquid phase.

The mixing of the various constituents of the slip may be performed according to any technique known to those skilled in the art, for example in a mixer, a jar mill with beads, preferably of the same nature as the ceramic powder in suspension.

If a jar mill is used, the mixing time is preferably more than 6 hours and less than 20 hours. Preferably, a jar mill is used.

Preferably, the pH is measured between 30 minutes and 1 hour after the introduction of the last constituent, and adjusted if necessary.

In step b), the slip is preferably poured into a mould suitable for the oriented freezing of the following step.

Preferably, a method according to the invention also comprises an operation for the removal of air bubbles, preferably before pouring the slip into the mould. The removal of air bubbles is preferably performed by degassing under vacuum or by ultrasonication.

In step c), the slip is cooled so as to freeze the water and to form ice crystals. The presence of the crystal growth activator promotes the growth of an ice crystal along one or more preferred directions, known as the "directions of growth". In order for the directions of growth of the various crystals to be substantially parallel, the slip is gradually frozen by creating and then moving, in the slip, a zone of rapid thermal transition between an upstream region in which the water is frozen and a downstream region in which the water is liquid. Its passage through the slip leads to solidification of the water. This is why it is conventionally referred to as the "solidification front".

The creation and movement of a solidification front, which are necessary for oriented freezing of the slip, are techniques commonly used in the field of "ice templating". This technique is a particular embodiment of the general method of "freeze casting". Preferably, a liquid is used, in particular liquid nitrogen, to create the solidification front.

Preferably, the speed of the solidification front is greater than 1 µm/s, preferably greater than 5 µm/s, preferably greater than 10 µm/s and/or less than 400 µm/s, preferably less than 300 µm/s, preferably less than 200 µm/s, preferably less than 100 µm/s, or even less than 50 µm/s, or even less than 30 µm/s. On passage of the solidification front, the new ice crystals become oriented, and then grow substantially in the direction of solidification imposed by the thermal gradient.

The size of the ice crystals depends mainly on the speed of movement of the solidification front and on the thermal gradient associated with this solidification front. The higher the speed of solidification, the smaller the size of the ice crystals.

The size of the ice crystals may also be modified by the composition of the slip, and in particular by the optional presence of a binder and/or by the size of the particles of the ceramic powder.

The solidification front is determined to lead to a gradual and limited reduction of the cross section of the ice crystals. The examples below give values that may be used to obtain such ice crystals. Slightly frustoconical pores result therefrom, unlike the pores formed by coextrusion.

When a product according to the invention is intended to be infiltrated with an infiltration material, the frustoconical shape of the tubular pores improves the infiltration.

Pores manufactured by "ice templating" are conventionally frustoconical, unless the speed of the solidification front is not constant. One technique for maintaining a constant speed of the solidification front is described in "*Control of lamellae spacing during freeze casting of ceramics using double-side cooling as a novel processing route*", Waschkies et al., J. Am. Ceram. Soc., 92 [S1] S79-S84 (2009).

The shape of the solidification front is not limiting. In particular, the solidification front may be flat at the scale of the manufactured block.

The direction of movement of the solidification front is preferably straight, leading to crystals that are substantially rectilinear in the direction of solidification. Advantageously, it is thus possible to create long ice crystals, which are substantially parallel to each other. The freezing of water leads to concentration of the ceramic particles in the spaces between the ice crystals.

Several solidification fronts, having identical or different thermal gradients and/or shapes, may be created and moved, successively or simultaneously, in identical or different directions, at identical or different speeds. In particular, when the slip has been poured into a mould, several solidification fronts may start from different faces of the mould, for example from each of the faces of the mould. The ice crystals are then oriented from the exterior towards the core of the block of frozen slip.

Preferably, the direction of movement of a solidification front is substantially perpendicular to the surface from which it starts.

The shape of the cross section of the pores depends mainly on the speed of the solidification front.

To manufacture a product according to the second main embodiment when the growth activator comprises, or even is formed from, zirconium acetate, the speed of the solidification front must be greater than 40 µm/s, preferably greater than 50 µm/s, preferably greater than 60 µm/s, preferably greater than 80 µm/s, preferably greater than 90 µm/s.

Preferably, all of the slip is frozen during step c).

In step d), the block of frozen slip is removed from the mould. Preferably, the temperature conditions are adapted to avoid any melting of the ice crystals.

In step e), the block of frozen slip is placed under pressure and temperature conditions that lead to removal of the ice crystals.

Preferably, the removal results from sublimation of the ice crystals. The water then passes directly from the solid state to the gaseous state. Advantageously, sublimation of the ice crystals allows a removal of water substantially without moving the ceramic particles arranged between these crystals. For example, the ice crystals can be sublimated by heating them at very low pressure, typically below 0.5 mbar.

The ice crystals may also be melted, and the liquid water obtained run off.

The disappearance of an ice crystal leaves a pore delimited by a wall mainly formed by the ceramic particles, the shape of this pore corresponding substantially to the shape of the removed crystal. Thus, the creation of elongated ice crystals, substantially parallel to each other, leads to the creation of tubular pores, which are also parallel to each other.

A porous preform is thus obtained.

The presence of a binder makes it possible to increase the mechanical strength of the porous preform.

Step e) preferably continues until all of the ice crystals have been removed.

In step f), the porous preform is arranged so as to be able to be heated. The optional binder is then removed. The steady-stage time, the temperature and the atmosphere of the binder-removal treatment are determined as a function of the nature of the binder(s) used.

Preferably, a method comprises a step g) of sintering, leading to an increase in the mechanical strength. The porous sintered product resulting therefrom advantageously has good mechanical strength, even after removal of the binder. The steady-stage time, the temperature and the atmosphere for the sintering are determined as a function of the nature and characteristics of the product to be manufactured. These parameters are well known to those skilled in the art.

In one preferred embodiment, the binder removal and the sintering are performed during the same thermal treatment, steps f) and g) being combined.

The sintering may also be performed after placing the porous preform in its working position, for example if a product according to the invention is used as catalysis support in a reactor functioning at high temperature.

In step g), the sintering is preferably performed at a temperature above 1000° C., or even above 1100° C., or even above 1200° C., or even above 1300° C., or even above 1400° C., under a neutral, reductive or oxidative atmosphere. The sintering may be performed in air.

In step h), the porous product may be machined via any technique known to those skilled in the art. Preferably, the porous product is machined so as to remove the transition zone corresponding to the start of the solidification front and to the establishment of a stable solidification regime, the solidification regime being said to be "stable" when the preferential direction of growth of the ice crystals is substantially identical to the direction of movement of the solidification front.

The impregnation may be performed by any technique known to those skilled in the art. Preferably, the impregnation is impregnation using a liquid medium.

A method according to the invention allows the manufacture of a porous product made of a ceramic material, which is thus particularly capable of withstanding high temperatures and heat shocks.

The pores are preferably open at both ends. It is thus easier to fill them with an impregnation material. However, the pores may also be blind.

When they are frustoconical and through-pores (i.e. when they open at both ends), they each open via a large aperture and a narrow aperture.

Preferably, the ratio of the mean equivalent diameter of the narrow apertures to the mean equivalent diameter of the large apertures of the through-pores is preferably less than 0.99, preferably less than 0.95, or even less than 0.90, or even less than 0.85, or even less than 0.80, or even less than 0.75. Advantageously, the large apertures of the pores may all be on the same side of the pores, or even may be substantially coplanar.

The cross section of the pores may or may not be circular. In particular, it may be polygonal, and especially convex hexagonal.

The particular shape of the tubular pores allows them to be very efficiently infiltrated with an impregnation material, especially with an impregnation material chosen from groups A and/or B above, in particular to make a composite material. This efficacy is noteworthy when the particles of the impregnation material, generally in suspension, have a median size that is less than 0.1 times the mean equivalent diameter of the large apertures of the frustoconical tubular pores, preferably less than 0.1 times the mean equivalent diameter of the narrow apertures of the said pores. The median size of the particles of the impregnation material may typically be between 0.01 µm and 4 µm.

Preferably, when a product according to the invention is impregnated with an impregnation material, the penetration of the impregnation material takes place via the largest of the pores.

The articles "*Fabrication of Microconfigured Multicomponent Ceramics*", Crumm et al., J. Am. Ceram. Soc., 81 [4], p 1053-57 (1998), "*Fabrication of macrochannelled hydroxyhapatite bioceramic by coextrusion process*", Young-Hag Koh et al., J. Am. Ceram. Soc., Vol. 85 [10], p 2578-2580 (2002), "*Microfabrication of ceramics by coextrusion*", Van Hoy et al., J. Am. Ceram. Soc., Vol. 81 [1], p 152-158 (1998) and "*Fabrication and properties of an anisotropic $TiO_2$ dielectric composite*", Wing et al., J. Am. Ceram. Soc., 89 [9], p 2812-2815 (2006) describe products manufactured by coextrusion. The shape of the tubular pores of these products is thus different from that of a product according to the invention.

In addition, the product described in the article "*Fabrication of Microconfigured Multicomponent Ceramics*" incorporates a metal, which makes it uncapable of withstanding high temperatures, and those described in "*Microfabrication of ceramics by coextrusion*" and "*Fabrication and properties of anisotropic $TiO_2$ dielectric composite*" do not have convex pores.

The article "*Synthesis of silica-based porous monoliths with straight nanochannels using an ice-rod nanoarray as a*

*template*", Nishihara et al., J. Mater. Chem., 2008, 18, 3662-3670, describes a porous product made of amorphous silica obtained by ice templating.

A product according to the invention may be used in the abovementioned applications. In particular, it may serve in a drop separator or in a trickle block for an air processing plant in order to separate out the water carried by this air, and thus limit the risks of legionellosis.

EXAMPLES

The products of the examples were manufactured according to a method comprising steps a) to f) described above. The following starting materials were used:
zirconia powder containing 8 mol % of $Y_2O_3$ (TZ8Y sold by the company TOSOH);
alumina powder TM-DAR Taimicron sold by the company Krahn Chemie GmbH;
silicon carbide powder Hexoloy® SA "ready to press" sold by the company Saint-Gobain, calcined for 1 hour at 500° C. in order to facilitate its deagglomeration;
zirconium acetate sold by the company Saint-Gobain;
zirconium acetate sold by the company Aldrich;
polyvinyl alcohol (PVA) AIRVOL 205 sold by the company Air Products & Chemicals, Inc.;
polyvinyl alcohol (PVA) Polyviol® Solution LL6036 sold by the company Wackker;
polyethylene glycol PEG6M sold by the company Merck;
binder OPTAPIX PAF35 sold by the company Zschimmer & Schwarz.

For each example, the slip was mixed in a jar mill for 12 hours.

For each example, the slip was poured into a mould whose bottom is in contact with a copper cylinder cooled with liquid nitrogen, and whose other walls are in contact with the ambient medium. The rate of cooling of the copper cylinder makes it possible to adjust the rate of movement of the solidification front (v) within the slip.

For each example, the sublimation was performed by removing the frozen block of slip from the mould and then placing it in a lyophilizer for 48 hours at a pressure of 0.42 mbar.

The product of Example 1 underwent a binder removal step f) performed with the following cycle: temperature rise at a rate of 600° C./h up to 500° C., steady stage of 1 hour at 500° C., temperature decrease to room temperature.

The products of Examples 2, 4, 6 and 7 underwent a binder removal step f) performed with the following cycle: temperature rise at a rate of 180° C./h up to 500° C., steady stage of 1 hour at 500° C., temperature decrease to room temperature.

The products of Examples 3 and 5 did not undergo any binder removal.

The product of Example 1 underwent a sintering step g) performed with the following cycle: temperature rise at a rate of 600° C./h up to 1350° C., steady stage of 3 hours at 1350° C., temperature decrease at a rate of 600° C./h to room temperature.

The products of Examples 2, 4, 6 and 7 underwent a sintering step g) performed with the following cycle: temperature rise at a rate of 300° C./h up to 1350° C., steady stage of 3 hours at 1350° C., temperature decrease at a rate of 300° C./h to room temperature.

The product of Example 3 did not undergo sintering.

The product of Example 5 underwent a sintering step g) performed with the following cycle: temperature rise at a rate of 600° C./h to 1400° C., steady stage of 3 hours at 1400° C., temperature decrease at a rate of 600° C./h to room temperature.

The products of Examples 8, 9 and 10 underwent a sintering step g) performed with the following cycle: temperature rise at a rate of 300° C./h to 1350° C., steady stage of 3 hours at 1350° C., temperature decrease at a rate of 300° C./h to room temperature.

The following characterization methods were used:

The "concentration of zirconium provided by zirconium acetate" is evaluated by measuring the mass of zirconia obtained after having subjected the compound introducing the zirconium acetate to stoving at 110° C. for 16 hours, and then to baking in air (loss on ignition) at 1000° C. for 2 hours. The mass of zirconium is obtained by multiplying the weighed mass of zirconia by the ratio of their molar masses, i.e. about 91/123. The concentration of zirconium provided by zirconium acetate is obtained by dividing this mass of zirconium, in grammes, by the volume in liters of the liquid phase of the slip.

To determine whether an additive is a growth activator, a sample of frozen slip is prepared according to steps a) to d), the freezing being performed in a directional manner. Once the surface of the sample is frozen, the temperature is kept constant and an analysis by X-ray diffraction is performed. The X-ray diffractograms show diffraction peaks generated by the interaction of the X-rays with the ice crystals and with the powder of ceramic particles. In particular for ice, the said diagram demonstrates peaks generated by plane (002) and plane (100), as shown in FIGS. 17 and 18.

An orientation of the ice crystals such that plane (002) becomes largely predominant, the other planes greatly decreasing, or even disappearing, indicates that the additive is a growth activator. Specifically, a preferential orientation of the ice crystals such that the axis c is substantially perpendicular to the direction of freezing leads to a decrease of the ratio U=(intensity of the peak of strongest intensity other than (002)/intensity of peak (002)).

Figure 17:
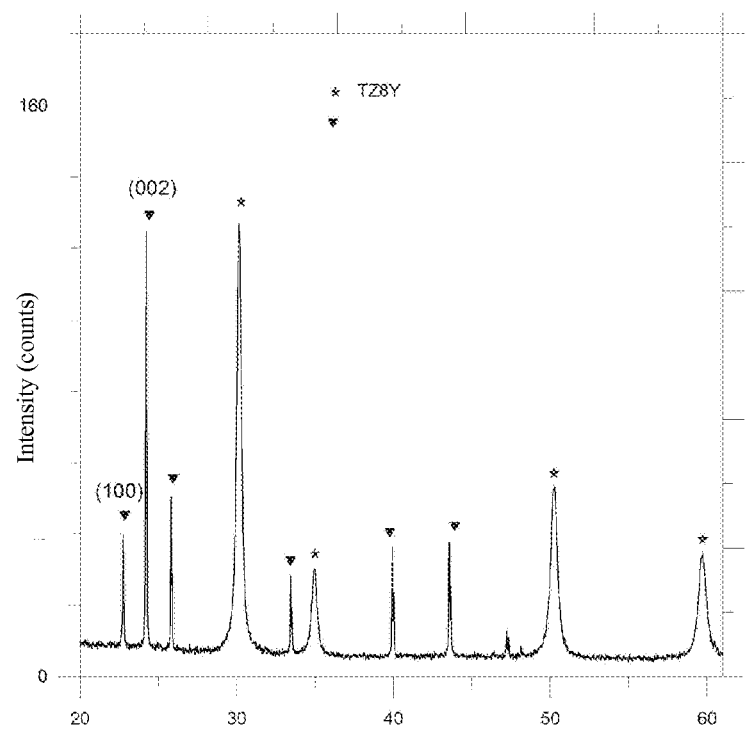
FIG. 17 is an X-ray diffraction diagram produced during the freezing of a product not containing any zirconium acetate.

For example, FIG. 17 presents an X-ray diffractogram obtained by freezing a suspension of zirconia powder not containing zirconium acetate. The peaks marked with a triangle correspond to the ice crystals. The x-axis represents the 2θ angular domain, the y-axis represents the intensity, as the number of counts. The ratio U is substantially equal to 32%.

Figure 18:
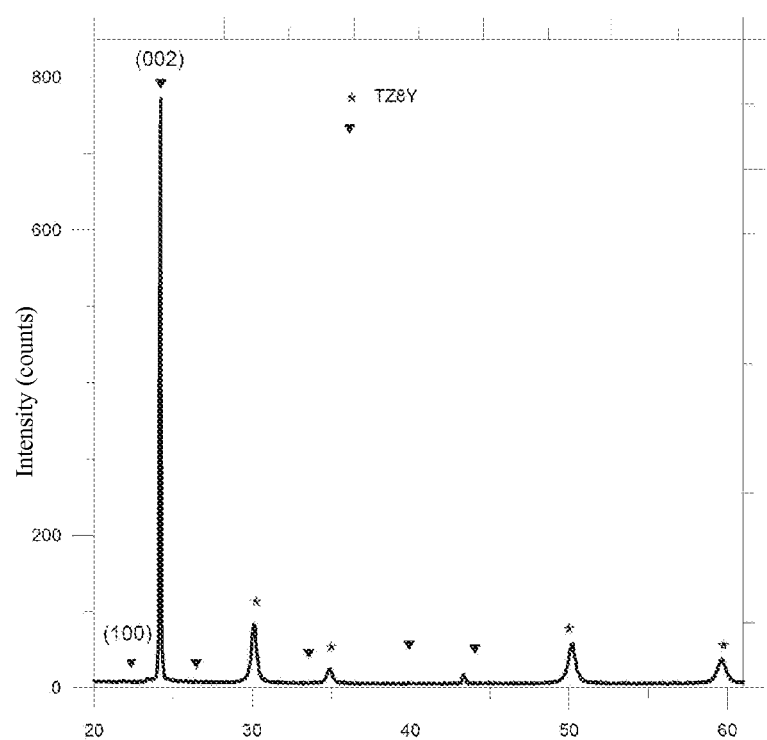
FIG. 18 is an X-ray diffraction diagram produced during the freezing of a product containing zirconium acetate.

FIG. 18 shows an X-ray diffractogram obtained by identical freezing of the same suspension of zirconia powder containing zirconium acetate. The peaks labelled with a triangle correspond to the ice crystals. The X-axis represents the 2θ angular domain, the y-axis represents the intensity, as number of counts. The ratio U here is substantially equal to 0%.

Thus, a growth activator according to the invention induces a low ratio U. Preferably, a growth activator according to the invention induces a ratio U of less than 10, preferably less than 5, preferably less than 2, preferably less than 1, preferably less than 0.5, preferably substantially equal to 0.

The measurement of the mean size of the pores is determined via the following method:

The sample to be analysed is infiltrated with a resin, for example an epoxy resin. A slice to be analysed is cut perpendicular to the direction of solidification, and polished so as to obtain a good surface state, the said polishing being performed at least with 1200-grade paper, and preferably with a diamond paste. Images are taken using a scanning electron microscope (SEM), preferably in a mode using back-scattered electrons (BSE mode) so as to obtain a very good contrast between the ceramic phase and the resin. Each image has a minimum of 1280×960 pixels, without the scale bar. The magnification used is such that the width of the image is between 50 times and 100 times the average pore size. A first image may be produced by means of a visual estimation of the mean pore size.

The mean pore size is determined by analysis of these images according to the erosion/expansion method described in "*Characterization of the morphology of cellular ceramics by 3D image processing of X-ray tomography*", Maire et al., J. Eur. Ceram. Soc., 27[4] 1973-1981 (2007).

The convexity index Ic of a pore in a cross-section plane is the ratio Sp/Sc where Sp denotes the area of the cross section of the pore, delimited by its perimeter, and Sc denotes the convex surface of this cross section, i.e. the surface of the convex envelope of this cross section.

Conventionally, the term "convex envelope" refers to the line of externally convex closed shape, of minimum length and containing the perimeter of the said pore, the perimeter conventionally denoting the shape line that closes the section of the pore. The convex envelope thus superposes on the convex or rectilinear portions of the perimeter and follows chords that in each case join two convex or rectilinear portions separated by a concave portion (viewed from the exterior). A convex envelope may be compared to the region delimited by a taut elastic pressing exclusively on the perimeter.

Figure 9:
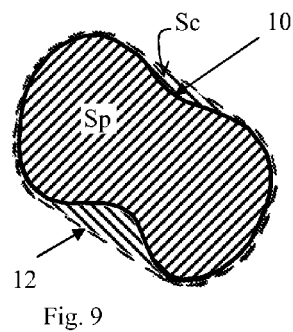

For example, in FIG. 9, the perimeter 10 of a cross section of a pore is shown, as is the convex envelope 12 of this pore. If we note as $S_p$ the surface of the pore, delimited by the perimeter 10, and $S_c$ the convex surface of the said pore corresponding to the surface delimited by the convex envelope 12, then the convexity index Ic is equal to $S_p/S_c$. The convexity index Ic is thus equal to 100% for a circle, an ellipse or an oval, but also for a polygon such as a triangle, a parallelogram, a hexagon or a pentagon. It is less than 100% for pores whose perimeter has, viewed from the exterior, one or more recesses.

Figure 10:
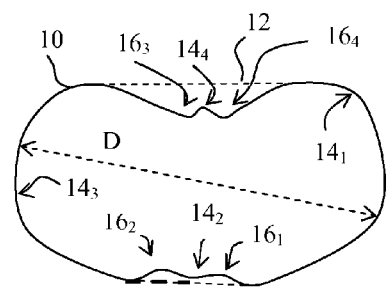
FIGS. 9 and 10 illustrate the method for evaluating the criterion (c)
Figure 8:
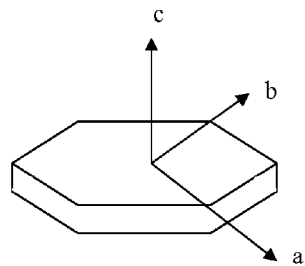
FIG. 8 schematically shows an ice crystal.

FIG. 10 shows a pore whose perimeter has concave portions $16_{1-4}$ and convex portions $14_{1-4}$. In this figure, the convex envelope 12 connects the two convex portions $14_1$ and $14_3$. The convex portions ($14_{1-2}$) are ignored.

The convexity index Ic may be evaluated via the following non-limiting method:

The sample to be analysed is infiltrated with a resin, for example an epoxy resin. A slice to be analysed is cut perpendicular to the direction of solidification, and then polished so as to obtain a good surface state, the said polishing being performed at least with a 1200-grade paper, preferably with diamond paste. Images are then taken using a scanning electron microscope (SEM), preferably in a mode using back-scattered electrons (BSE mode) so as to obtain a very good contrast between the ceramic phase and the resin. Each image presents a minimum of 1280×960 pixels, without the scale bar. The magnification used is such that the width of the image is between 50 times and 100 times the mean pore size. A first image may be produced by means of a visual estimation of the mean pore size.

The image is then analysed using the imageJ software, available from the web site http://rsbweb.nih.gov/ij/ according to the following method:
open the image in imageJ;
crop the image ("Crop" function) to remove the scale bar or any other additional information that is on the image;
adjust the brightness with the "Image>Adjust>Brightness/contrast" function and then click on "Auto";
binarize the image with the Multithresholder function ("Plugin>Filter>Multithresholder"), and then select the "Isodata" mode to set the threshold for distinguishing the material to be analysed from the infiltrated resin;
ensure that the pores to be analysed appear in black on the image (value 255 for white, 0 for black). If such is not the case, invert the image using the "Edit>Invert" function;
analyse the pores using the "Analyse>Analyse particles" function. The parameters for the pore analysis may be the following: "size min": 0.2× the mean pore size measured previously; "size max": none, "exclude on edges" so as not to analyse the pores intercepted by the edges of the image, do not tick the option "include holes";
check that at least 50 pores have been analysed. If such is not the case, analyse other images such that the total number of pores analysed is greater than or equal to 50;
in the table of results, for each pore, record the solidity index ("solidity");
classify the pores in order of increasing solidity index;
plot the numerical cumulative fraction as a function of the solidity index Is.

The cumulative curve makes it possible to check whether criterion (d) has been satisfied.

The solidity index measured in this way gives a very good approximation of the convexity index Ic and may thus also be used to estimate whether criterion (c) has been satisfied.

Figure 11:
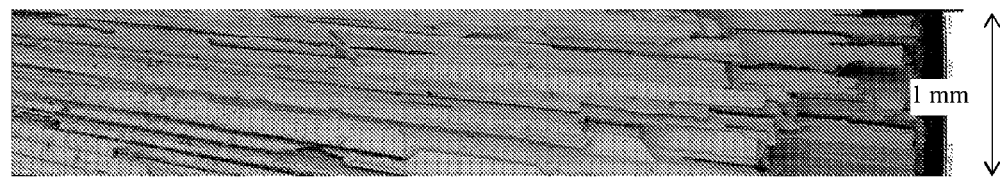
FIGS. 11, 12a and 12b are images taken using a scanning electron microscope (SEM) of a porous product according to the first main embodiment of the invention.

The "tubular" nature of a pore is determined by observation of photographs of pores, in particular in perspective (see FIG. 11) or in longitudinal section.

The open porosity is measured according to standard ISO15901-1.

The pH is measured after leaving the slip to stand for a time of between 30 minutes and one hour.

The mechanical compression strength of a porous substance is measured according to standard EN1094-5.

The roundness index is determined according to the same method as that used for measuring the convexity index up to the antepenultimate step. The magnification used is such that the width of the image is between 10 times and 20 times the mean pore size, and then:
check that at least 100 pores have been analysed. If necessary, perform the analysis on several different images, such that the total number of pores analysed is greater than or equal to 100;
in the table of results, for each pore, record the roundness index ("roundness");
classify the pores in order of increasing roundness index;
plot the numerical cumulative fraction as a function of the roundness index.

The cumulative curve makes it possible to check whether criterion (b') has been satisfied. By considering a cross section of a pore, the ratio R is the ratio between the length Cgd of the longest side and the length Cpt of the smallest side of the convex hexagon HG of minimum area and external to the cross section.

This ratio is determined according to the same method as that used for measuring the convexity index, up to the antepenultimate step. Then, for each pore of convex hexagonal section, the smallest hexagonal envelope (convex hexagon HG) is plotted, and the longest side Cgd and the smallest side Cpt are then measured and R=Cgd/Cpt is calculated.

The ratio R' denotes the ratio of the mean equivalent diameter of the narrow apertures to the mean equivalent diameter of the large apertures of the through-pores.

Table 1 below summarizes the results obtained.

Examples 8 to 10 below are provided in order to illustrate more specifically the second main embodiment of the invention. Example 3 above is also in accordance with the second main embodiment.

TABLE 1

| Example | | 1 | 2 | 3 | 4 | 5* | 6* | 7* |
|---|---|---|---|---|---|---|---|---|
| Composition of the slip | | | | | | | | |
| Ceramic powder (vol %) | TZ8Y | 10.0% | | | 17.0% | 12.5% | | |
| | TM-DAR | | 23.6% | | | | 23.6% | 21.5% |
| | Hexoloy ® | | | 21.0% | | | | |
| Concentration of crystal growth activator (g/l of liquid phase) | Zirconium acetate Saint-Gobain | 26 g/l | 47 g/l | 33 g/l | | | 5 g/l | |
| | Zirconium acetate Aldrich | | | | 19 g/l | | | |
| Temporary binder (mass % on the basis of the mass of ceramic powder) | AIRVOL 205 | 5.0% | | | | | | |
| | LL6036 | | | | 2.0% | | | |
| | PEG6M | | 5.0% | 10.0% | | 7.5% | 5.0% | |
| | OPTAPIX PAF35 | | | | | | | 5.0% |
| Acid/base (volume % on the basis of water) | Sodium silicate at a pH equal to 10.1 | | | 1.0% | | | | |
| Water | | | | | Remainder | | | |
| pH of the slip | | 3.0 | 3.6 | 4.2 | 4.4 | 3.0 | 3.6 | 8.2 |
| Speed of the solidification front v (µm/s) | | 18 | 30 | 47 | 37 | 17 | 23 | 16 |
| Figure | | 1 | 2 | 3 | 4 | 5 | 6 | 7 |
| Porosity | | | | | | | | |
| Tubular shape of the pores | | Tubular | Tubular | Tubular | Tubular | Tubular | Tubular | Tubular |
| Frustoconical shape of the pores | | Frusto-conical | Frusto-conical | Frusto-conical | Frusto-conical | Frusto-conical | Frusto-conical | Frusto-conical |
| Ratio R' | | 0.68 | 0.78 | 0.54 | 0.92 | | | |
| Mean pore size (µm) | | 11.8 | 25.9 | 17.6 | 4.5 | 10.6 | 12.1 | 17.3 |
| Convexity index | | 50% of the pores have an Ic > 90% | 60% of the pores have an Ic > 88% | 60% of the pores have an Ic > 88% | 60% of the pores have an Ic > 88% | Less than 45% of the pores have an Ic > 87% | Less than 15% of the pores have an Ic > 87% | Less than 40% of the pores have an Ic > 87% |

*example outside the invention

Other measurements made it possible to determine the following characteristics:

In the product according to Example 5, less than 39% of the pores have a convexity index Ic>88%, less than 32% of the pores have a convexity index Ic>90%, less than 24% of the pores have a convexity index Ic>91%, less than 16% of the pores have a convexity index Ic>92%, and less than 10% of the pores have a convexity index Ic>93%.

In the product according to Example 6, less than 8% of the pores have a convexity index Ic>88%, less than 5% of the pores have a convexity index Ic>89%, and less than 2% of the pores have a convexity index Ic>92%.

In the product according to Example 7, less than 36% of the pores have a convexity index Ic>89%, less than 30% of the pores have a convexity index Ic>90%, and less than 23% of the pores have an index Ic>92%.

Examples 1 to 4 show that it is possible to obtain a porous product according to the invention via a method according to the invention.

A comparison of Examples 2, 6 and 7 demonstrates that concentrations of zirconium provided by zirconium acetate of less than 5 g/l (Example 6), or even zero (Example 7), do not make it possible, with zirconium acetate, to manufacture a porous product according to the invention.

Figure 12A:
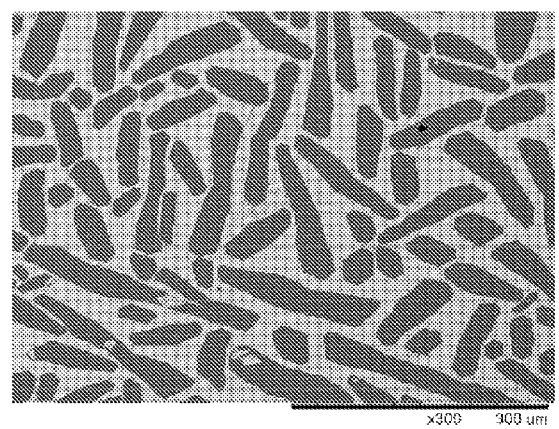
Figure 12B:
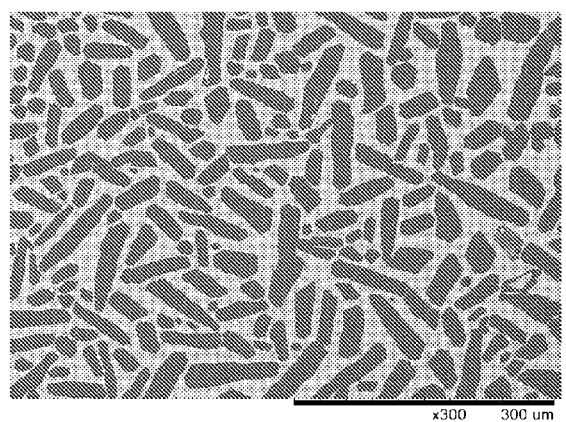
Figure 13:
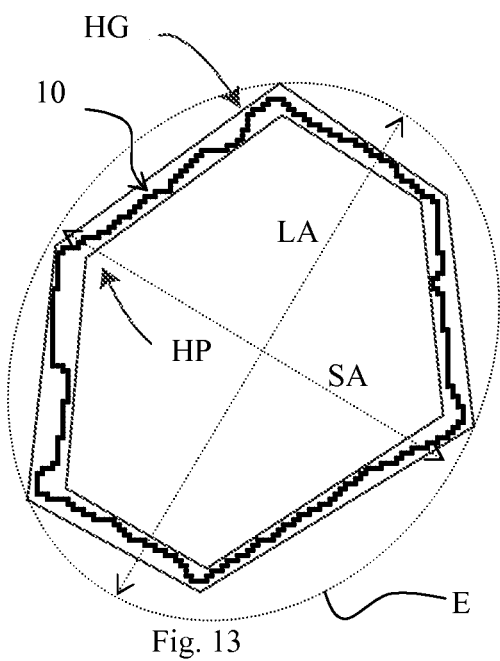
FIG. 13 illustrates the definition of a "convex hexagonal" shape.
Figure 14:
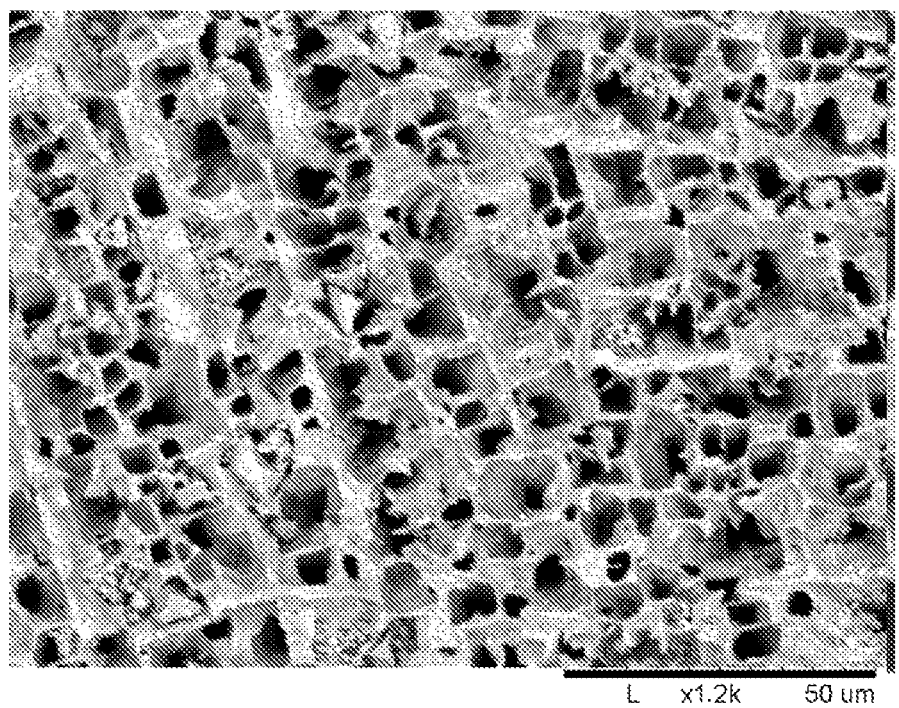
FIGS. 14 to 16 are images taken using a scanning electron microscope (SEM) of Examples 8 to 10, respectively.
Figure 15:
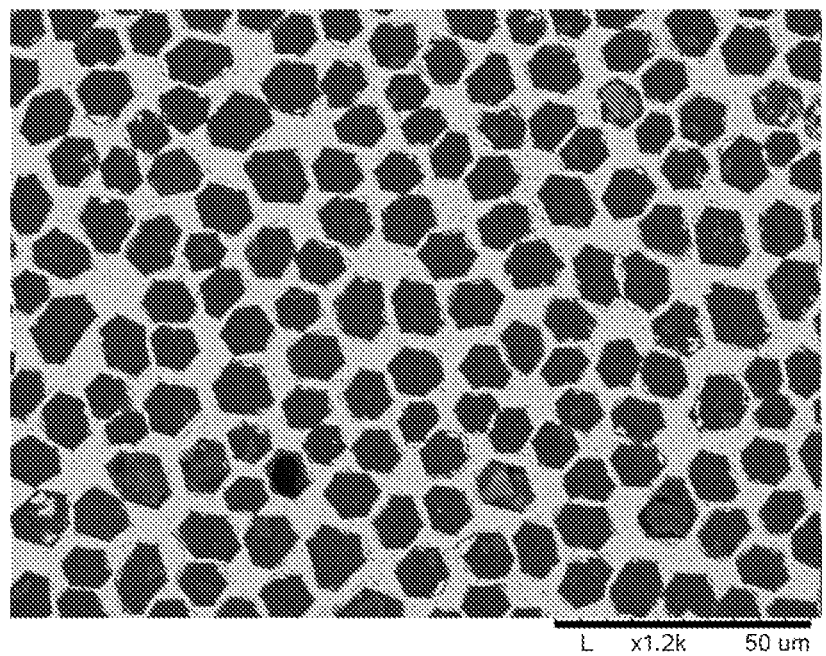
Figure 16:
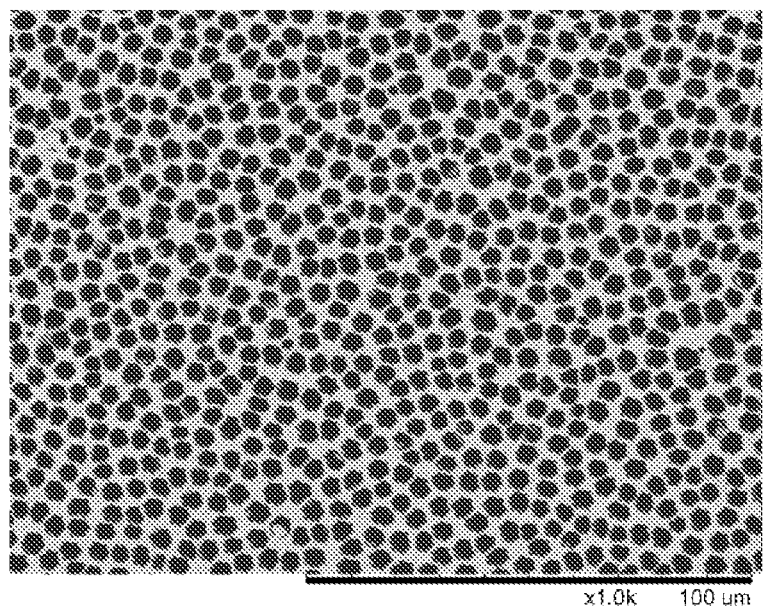

FIGS. 12a and 12b are images, at the same scale, produced by scanning electron microscopy, of the two opposite faces, separated by 10 mm, of the product according to Example 2. The face represented in FIG. 12a shows the large apertures of the pores and the face represented in FIG. 12b shows the narrow apertures of these pores.

TABLE 2

| Example | | 8* | 9 | 10 |
|---|---|---|---|---|
| Ceramic powder (vol %) | TZ8Y | 17 | 16.5 | 17.2 |
| Concentration of crystal growth activator (g/l of liquid phase) | Zirconium acetate Saint-Gobain | 0 | 17.8 | 17.9 |
| Temporary binder (mass % on the basis of the mass of the ceramic powder) | LL6036 | 23 | — | — |
| | PEG6M | — | 5 | 5 |
| Water | | | Remainder | |
| pH of the slip | | 4 | 3.9 | 3.9 |
| Speed of the solidification front v (µm/s) | | 70 | 45 | 95 |
| Figure | | 14 | 15 | 16 |
| Tubular shape of the pores | | Tubular | Tubular | Tubular |
| Frustoconical shape of the pores | | Frusto-conical | Frusto-conical | Frusto-conical |
| Ratio R' | | 0.82 | 0.84 | 0.88 |
| Mean size (µm) | | 4.5 | 7 | 3.7 |
| Shape of the sections of the pores | | Any | Convex hexagonal | Convex hexagonal |
| Numerical % of hexagonal pores with a roundness index of greater than 0.7 | | — | 93% | 97% |
| Mechanical strength (in Mpa) | | 35 | 130 | — |

*example outside the invention

A comparison of Examples 8 and 9 demonstrates that the product of Example 9, whose pores are of convex hexagonal shape, has much better mechanical strength than that of the product of Example 8, whose pores are of any shape.

Needless to say, the invention is not limited to the embodiments supplied as examples. In particular, several different ceramic powders may be mixed in the slip in step a).

The invention claimed is:

1. Product formed from a ceramic material, at least part of the product not being formed from amorphous silica and comprising pores and satisfying the following criteria (a), (b) and (c):
   (a) at least 70% by number of the pores are frustoconical tubular pores extending substantially parallel to each other in a longitudinal direction;
   (b) in at least one cross-section plane, the mean size of the cross sections of the pores is greater than 0.15 µm and less than 300 µm;
   (c) in at least one cross-section plane, at least 60% by number of the pores have a convexity index Ic of greater than 87%, the convexity index of a pore being equal to the ratio of Sp/Sc of the surface areas Sp and Sc delimited by the perimeter and by the convex envelope of the pore, respectively,
   the ceramic material being chosen from the group formed by zirconium oxide, partially stabilized zirconium oxide, stabilized zirconium oxide, yttrium oxide, doped yttrium oxide, titanium oxide, aluminosilicates, cordierite, aluminum oxide, hydrated aluminas, magnesium oxide, talc, nickel oxide, iron oxides, cerium oxide, doped cerium oxide, oxides of perovskite structure, compounds comprising titanium of the type $La_4Sr_8Ti_{11}Mn_{1-x}Ga_xO_{38}$ with $0 \leq x \leq 1$ and $La_4Sr_8Ti_{12-n}Mn_nO_{38}$ with $0 \leq n \leq 1$, compounds of the type $BaTiO_3$, $BaZrO_3$, $Pb(Mg_{0.25}Nb_{0.75})O_3$, $Ba(Zn_{0.25}Nb_{0.75})O_3$, $Pb(Zn_{0.25}Nb_{0.75})O_3$, $PbTiO_3$, $CaCu_3Ti_4O_{12}$, compounds of bimevox-type structure, compounds of lamox-type structure, compounds of the type $SrCe_{1-x}M_xO_3$ with $0 \leq x \leq 1$ and M being a rare-earth metal, compounds of the type $BaCe_{1-x}M_xO_3$, with $0 \leq x \leq 1$ and M being a rare-earth metal, compounds of the family $La_xSr_{1-x}ScO_3$ with $0 \leq x \leq 1$, zeolites of structure $Na_{x1}Ca_{x2}Mg_{x3}Ba_{x4}K_{x5}Al_{x6}(Si_{x7}O_{x8}),x9H_2O$, x1 to x9 being positive integers or zero satisfying the following conditions: x6>0, x7>0, x8>0, x9>0 and x1+x2+x3+x4+x5>0, silicon carbide, silicon nitride, boron nitride, boron carbide, tungsten carbide, molybdenum disilicide $MoSi_2$ and titanium boride $TiB_2$, and mixtures thereof.

2. Product according to claim 1, wherein said mean size being greater than 2 µm and less than 200 µm.

3. Product according to claim 2, wherein said mean size being greater than 5 µm and less than 100 µm.

4. Product according to claim 1, wherein said mean size being less than 50 µm.

5. Product according to claim 4, wherein said mean size being less than 15 µm.

6. Product according to claim 5, wherein said mean size being less than 10 µm.

7. Product according to claim 1, in which at least 70% by number of the pores are frustoconical tubular pores opening at their two ends with wide and narrow apertures, respectively, known as "through-pores", the ratio of the mean equivalent diameter of the narrow apertures to the mean equivalent diameter of the large apertures of the through-pores being less than 0.95.

8. Product according to claim 1, in which the shape of the pores is such that:
   at least 70% by number of the pores have a convexity index Ic of greater than 87%, and/or
   at least 54% by number of the pores have a convexity index Ic of greater than 88%, and/or
   at least 40% by number of the pores have a convexity index Ic of greater than 89%, and/or
   at least 36% by number of the pores have a convexity index Ic of greater than 90%, and/or
   at least 20% by number of the pores have a convexity index Ic of greater than 91%, and/or
   at least 16% by number of the pores have a convexity index Ic of greater than 92%, and/or
   at least 4% by number of the pores have a convexity index Ic of greater than 93%.

9. Product according to claim 1, wherein said at least part of the product having a zirconia content by weight of greater than 1.5% and less than 40%.

10. Product according to claim 1, which has been sintered.

11. Method for the manufacture of the product according to claim 1, comprising the following successive steps:
    a) preparation of a slip that is suitable for the manufacture of a porous product according to claim 1 and the slip comprising, as a volume percentage, more than 4% of a powder of ceramic particles suspended in an aqueous liquid phase, the liquid phase comprising a crystal growth activator,
    b) optionally, pouring of the slip into a mold and/or removal of the air bubbles contained in the slip,
    c) oriented freezing of the slip so as to form a block comprising an assembly of ice crystals each having an elongated frustoconical tubular shape,
    d) optionally, stripping of the block of frozen slip from the mold,
    e) removal of the ice crystals from the frozen block of slip, optionally stripped from the mold, so as to obtain a porous preform,
    f) optionally, removal of binder from the porous preform obtained at the end of step e),
    g) optionally, sintering of the porous preform obtained at the end of step e) or f) so as to obtain a porous sintered product,
    h) optionally, machining and impregnation of the porous sintered product.

12. Method according to claim 11, in which the crystal growth activator comprises zirconium acetate.

13. Method according to claim 12, in which method, in step a),
    zirconium acetate is added to the slip in an amount such that the concentration of zirconium provided by the zirconium acetate is between 14 g/l and 170 g/l of aqueous liquid phase; and
    the powder of ceramic particles is introduced into the aqueous liquid phase after introduction of the zirconium acetate or zirconium acetate precursor(s); and
    the pH of the slip is adjusted to between 2.75 and 5; and
    the amount of powder of ceramic particles in the slip is less than 50% by volume; and in which, in step c), the speed of the solidification front is less than 400 µm/s.

14. Device chosen from a ceramic electrochemical cell, a fuel cell, a filtration element of a liquid or gaseous fluid, a storage microstructure, a catalyst support, a heat exchanger, a heat insulator, a fluid distributor, a drop separator or a trickle block for an air processing plant, a battery, a supercapacitor, a moisture adsorber, a combustion microchamber, the device comprising the product according to claim 1.

15. Method according to claim 11, wherein removal of the ice crystals from the frozen block of slip is optionally stripped from the mold by sublimation.

16. A device according to claim 14, said device being chosen among a filtration element of a liquid or gaseous fluid, a catalyst support, a fluid distributor and a combustion microchamber, wherein in the product, the cross-section of the pores having an average size of between 1 µm and 10 µm.

17. A device according to claim 14, said device being a solid oxide fuel cell comprising an electrode made of the product, wherein in the product, the cross-section of the pores having an average size of between 2 µm and 5 µm, and said mean size not being greater than 5 µm and less than 100 µm.

18. A device according to claim 14, said device being a solid oxide fuel cell of the SOFC type comprising an electrolyte made of the product, wherein in the product, the cross-section of the pores having an average size of between 10 and 30 µm, and said mean size not being less than 10 µm.

19. A device according to claim 14, said device being a single chamber fuel-cell, wherein in the product, the cross-section of the pores having an average size of between 1 and 100 µm, and said mean size of said product not being greater than 5 µm and less than 100 µm.

* * * * *